INVENTOR
PETER MICHAEL KNIGHT
BY Smith, Michael, Bradford & Gardiner
ATTORNEY

United States Patent Office 3,450,899

Patented June 17, 1969

3,450,899

QUADRATURE REJECTION CIRCUIT EMPLOYING TWO SWITCHING CIRCUITS CONNECTED IN PARALLEL ACROSS INPUT TERMINALS

Peter Michael Knight, London, England, assignor to Elliott Brothers (London) Limited, London, England, a British company Filed Aug. 17, 1966, Ser. No. 572,955
Claims priority, application Great Britain, Aug. 18, 1965, 35,328/65
Int. Cl. H03k 5/20
U.S. Cl. 307—232 7 Claims

ABSTRACT OF THE DISCLOSURE

A quadrature rejection circuit is disclosed in which two switching transistors are connected in parallel across two input terminals, one grounded, between which an input signal is applied. A reference signal, in phase with the in-phase component of the input signal, switches on the transistors alternately and thus repeatedly forwardly and reversely charges a capacitor connected between the collectors of the two transistors. An output is taken from one terminal of the capacitor and ground and is thus free of quadrature components in the input signal.

The invention relates to electrical filter arrangements for filtering current signals.

According to one aspect of the invention, there is provided an electrical filter arrangement for filtering alternating signals with which may occur other, unwanted, signals phase-displaced with respect thereto, comprising a pair of input terminals for receiving the said signals, storage means having a pair of terminals, switch means operative coincidentally with each half cycle of the alternating signal for repeatedly connecting the input terminals to the storage means whereby to store in the storage means a parameter dependent on the magnitude of the signals during the half cycles, the switch means connecting each said input terminal to a respective said terminal of the storage means during alternate said half cycles and connecting each said input terminal to the opposite said terminal of the storage means during the intervening said half cycles, whereby an output signal produced between a predetermined said terminal of the storage means and a predetermined said input terminal has an amplitude dependent on the amplitude of the said alternating signal and substantially independent of each said unwanted signal.

According to another aspect of the invention, there is provided an electrical filter arrangement for filtering alternating signals, comprising two terminal capacitive impedance means, an input circuit for applying the said alternating signal to the said capacitive impedance means, means for connecting an output circuit between a fixed datum potential and a particular said terminal of the said capacitive impedance means, and switch means operable to connect one said terminal of the said capacitive impedance means to the said datum potential during alternate half cycles of the alternating signal and to connect the other said terminal of the said capacitive impedance means to the said datum potential during the intervening half cycles of the alternating signal so as to produce an output signal in the said output circuit which is proportional to the amplitude of the said alternating signal and substantially independent of any other signal occurring with and in quadrature phase relationship to the said alternating signal.

According to a further aspect of the invention, there is provided a system for filtering alternating input signals having a main alternating component and an unwanted alternating component in substantially quadrature phase relationship to the said main component, comprising a pair of input terminals for receiving the said input signal, means controlled by the input signal for producing an alternating reference signal phase related to the said main component, a pair of switching circuits connected in parallel across the input terminals each of which comprises resistive means in series with an electrically controllable switch, capacitive means connected between the junction point in one switching circuit where the resistive means and the switch are connected and the corresponding junction point in the other switching circuit, a pair of output terminals connected across one said switch, and means connecting the reference signal to the said switches for controlling their operation, the switches being arranged so that when one switch is opened by the reference signal the other is closed whereby the signal produced across the output terminals has an amplitude proportional to the amplitude of the said main component of the input signal and substantially independent of the said unwanted component.

Two networks for suppressing quadrature components in alternating signals will now be described, by way of example, and with reference to the accompanying drawings in which.

Figure 5:
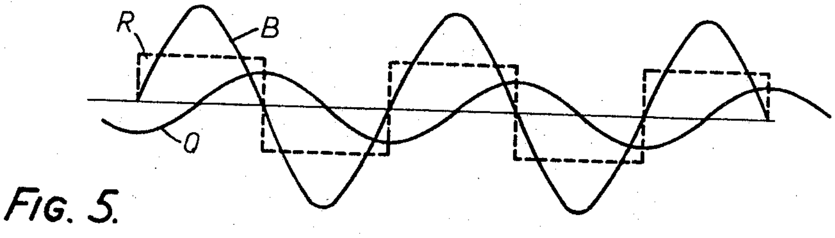
FIGURE 5 shows wave forms occurring in the networks.

The network (FIGURE 1) has two input terminals 5 and 6, the latter being earthed, which are connected to the source S of the alternating input signal. The input signal comprises a sinusoidal basic component B (FIGURE 5) and may also include noise and other components phase-displaced with reference to the basic component (for example, component Q, FIGURE 5, phase displaced by 90°). A direct current blocking capacitor C1 connects the terminal 5 to one end of each of two resistors RA and RB. The other end of each resistor RA, RB, is connected through the emitter-collector path of a respective n.p.n. transistor VTA, VTB, to the terminal 6. The collectors of the two transistors are interconnected by a capacitor C2. A pair of output terminals 7 and 8 are connected across the transistor VTB.

The bases of the transistors VTA, VTB are connected through resistors RC and RD to the source S. The base of the transistor VTA is supplied through the resistor RC with a square wave reference signal (R, FIGURE 5) in phase with the basic component B of the input signal. The base of the transistor VTB is supplied through the resistor RD with an inverted form (not shown in FIGURE 5) of the reference signal R supplied to the base of transistor VTA. The amplitudes of the square wave signals applied to the two bases are sufficient to switch the transistors, and, because the two signals have a mutual phase difference of 180°, it will be seen that one transistor is conducting when the other is non-conducting.

The operation of the network will now be described with particular reference to FIGURES 2 and 3. The capacitor C1 blocks the passage of any D.C. component of the input signal so that the voltage at point 9 varies above and below the potential (earth potential) of point 10.

Figure 2:
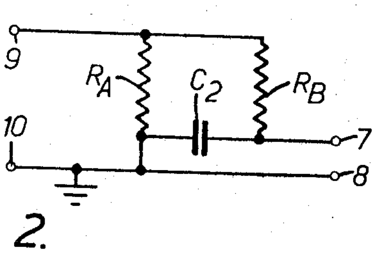
FIGURES 2 and 3 are equivalent circuits illustrating the operation of the network of FIGURE 1.

FIGURE 2 shows the circuit re-drawn as it exists during each half cycle of the basic component B of the input signal which renders point 9 positive with respect to point 10 as far as this component is concerned, the transistor VTA being maintained conductive during this time by the reference signal R applied to its base and the transistor VTB being maintained non-conductive by the inverted reference signal applied to its base. It will be seen that, under these conditions, the capacitor C2 charges up to a voltage (E) this voltage appearing between the output terminals.

Figure 1:
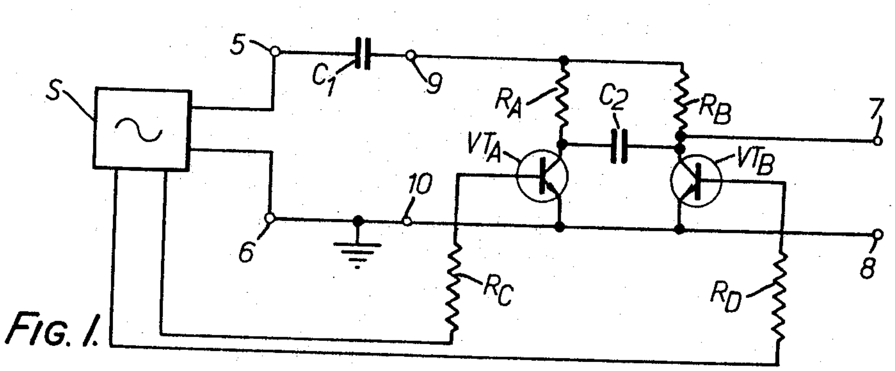
FIGURE 1 is a circuit diagram of one network.
Figure 3:
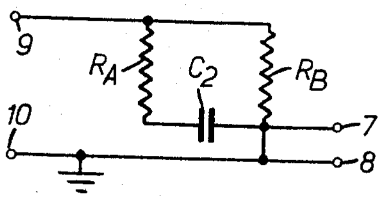

FIGURE 3 shows the circuit of FIGURE 1 re-drawn as it appears during each half cycle of the basic component B of the input signal which renders point 9 negative with respect to point 10 as far as this component is concerned, the transistor VTB being maintained conductive during this time by the inverted reference signal applied to its base and the transistor VTA being maintained non-conductive by the reference signal R. Therefore, the charge on capacitor C2 is reversed and the capacitor charges up to a voltage which has the same magnitude (E) as the voltage reached during positive half cycles of the basic component B, FIGURE 5, but with opposite polarity. As the output terminals 7 and 8 are now short-circuited by the transistor VTB, the voltage between them is zero.

The output signal produced at the terminals 7 and 8 therefore comprises a square wave of peak-to-peak value E. The voltage E depends on the charge produced on the capacitor C2 during both positive and negative half cycles of the basic component B and, therefore, the voltage E is the mean value of the full-wave rectified basic component B of the input signal. The voltage E, and hence the output signal at the terminals 7 and 8, is substantially independent of any noise or other components of the input signal having substantially quadrature phase relationship with the basic component B of the input signal; this is because such quadrature components (component Q, FIGURE 5, for example) produce both positive and negative portions during each half cycle of the basic component so that the resultant effect on the charge on capacitor C2 (and hence on the voltage E and the output signal) is nil.

In practice, the resistors RA and RB may be made equal. The values of these resistors and the values of the capacitor C2 are chosen such that their combined time constant produces adequately high rejection of quadrature components of the input signal and at the same time provides the required frequency response.

Figure 4:
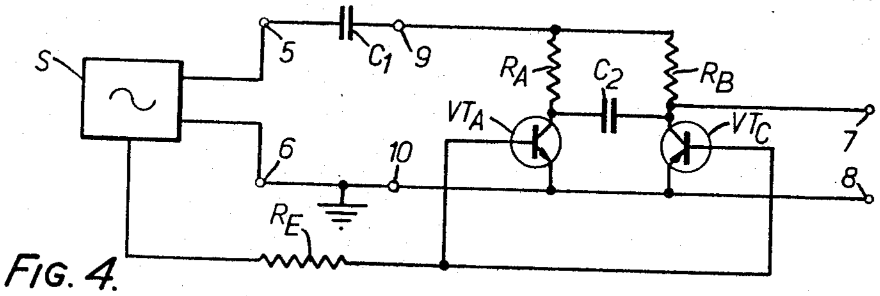
FIGURE 4 is a circuit diagram of another network embodying the invention.

In a modification, shown in FIGURE 4, the transistor VTB is replaced by a p.n.p. transistor VTC. The two transistors VTA and VTC are therefore of opposite conductivity-type and their bases may be connected together to a resistor RE and supplied in common with a reference signal which is in phase with the basic component of the input signal, the amplitude of this reference signal sufficient to switch one transistor off and at the same time to switch the other one on. The need for the inverted reference signal is therefore eliminated. In accordance with design techniques known to those skilled in the art, the circuit parameters are arranged such that transistors VTA and VTC operate continuously in the "switching" regions of their operating characteristics: thus, transistor VTC is switched on by the negative going signal applied to its base through resistor RE even though its collector is held positive at this instant by the charge on capacitor C2.

The quadrature suppression networks described require a maximum of only eight conventional componnets.

What is claimed is:

1. An electrical filter arrangement for filtering an alternating signal with which may occur an unwanted signal in quadrature phase-relationship with respect thereto, comprising first and second input terminals for receiving the said signals, a capacitor having first and second terminals, a first switching circuit connecting, when closed the first input terminal to the first capacitor terminal and the second input terminal to the second capacitor terminal, and a second switching circuit connecting, when closed, the first input terminal to the second capacitor terminal and the second input terminal to first capacitor terminal, each switching circuit including respective series resistive impedance means, control means operative in predetermined phase relationship with the said alternating signal and connected to close one only of the switching circuits during the alternate half cycles of the alternating signal and to close the other only of the switching circuits during the intervening half cycles whereby to store in the capacitor a charge dependent on the magnitude of the signals during each said half cycle, and output circuit means connected to a predetermined one of said capacitor terminals and to a predetermined one of said input terminals to produce an output signal having an amplitude dependent on the amplitude of the said alternating signal and substantially independent of the said unwanted signal.

2. An electrical filter arrangement according to claim 1, in which each said switch circuit comprises electrically controlled switch means operative in dependence on a reference signal substantially in phase with the said alternating signal.

3. An electrical filter arrangement for filtering alternating input signals having a main alternating component and an unwanted alternating component substantially in quadrature phase relationship to the said main component, comprising a pair of input terminals connected to receive a said input signal, a two-terminal capacitor, a pair of switching circuits connected in parallel across the input terminals, each switching circuit comprising respective resistive means and a respective transistor having a base, an emitter, and a collector and connected with its emitter-collector path in series with the said resistive means, one said terminal of the capacitor being connected to the junction in one said switching circuit where the resistive means is connected to the emitter-collector path of the respective transistor, and the other said terminal of the capacitor being connected to the corresponding junction in the other switching circuit, control means operative in predetermined phase relationship with the said main component of the input signal and connected to maintain one only of the said transistors conductive during alternate half cycles of the said main component and to maintain the other only of said transistors conductive during the intervening said half cycles whereby to store in the capacitor a charge dependent on the magnitude of the said input signal during each said half cycle, and output circuit means connected between a predetermined one of said terminals of the capacitor and a predetermined one of said input terminals to produce an output signal having an amplitude dependent on the amplitude of the said main alternating component and substantially independent of the said unwanted alternating component.

4. An electrical filter arrangement according to claim 3, in which the said control means comprises means for producing a reference signal in phase with the said main alternating component of the input signal, the two transistors being of opposite conductivity type and the said reference signal being applied in common to the bases of the two transistors so as to switch one transistor conductive and at the same time to switch the other transistor non-conductive.

5. An electrical filter arrangement according to claim 3, in which the said control means comprises means for producing a reference signal in phase with the said main alternating component and an inverted form of the said reference signal, the two transistors being of the same conductivity type, the said reference signal being applied to the base of one said transistor and the inverted form of the reference signal being applied to the base of the said other transistor whereby to switch one said transistor conductive and at the same time to switch the other transistor non-conductive.

6. An electrical filter arrangement according to claim 3, including a D.C. blocking capacitor connected between one said input terminal and the said switching circuits.

7. An electrical filter arrangement according to claim 3, in which one of said input terminals is grounded.

References Cited

UNITED STATES PATENTS

| | | | |
|---|---|---|---|
| 3,025,418 | 3/1962 | Brahm | 328—166 XR |
| 3,322,967 | 5/1967 | Gessner | 328—166 XR |
| 3,348,157 | 10/1967 | Sullivan et al. | 328—166 XR |

ARTHUR GAUSS, *Primary Examiner.*

JOHN ZAZWORSKY, *Assistant Examiner.*

U.S. Cl. X.R.

307—295; 328—166